No. 859,556.  PATENTED JULY 9, 1907.
H. M. FRIENDLY.
METHOD OF AND APPARATUS FOR FAULT LOCATION ON ELECTRICAL CONDUCTORS.
APPLICATION FILED APR. 10, 1905.

2 SHEETS—SHEET 1.

Witnesses:
Harael C. Prado.
David S. Hulfish.

H. M. Friendly,
Inventor,
by Kempster Buller
Attorney.

No. 859,556. PATENTED JULY 9, 1907.
H. M. FRIENDLY.
METHOD OF AND APPARATUS FOR FAULT LOCATION ON ELECTRICAL CONDUCTORS.
APPLICATION FILED APR. 10, 1905.

2 SHEETS—SHEET 2.

Witnesses:
Hazael C. Prado.
David S. Hulfish.

H. M. Friendly,
Inventor.
by Kempster B. Miller,
Attorney.

UNITED STATES PATENT OFFICE.

HERBERT M. FRIENDLY, OF PORTLAND, OREGON.

METHOD OF AND APPARATUS FOR FAULT LOCATION ON ELECTRICAL CONDUCTORS.

No. 859,556.     Specification of Letters Patent.     Patented July 9, 1907.

Application filed April 10, 1905. Serial No. 254,899.

*To all whom it may concern:*

Be it known that I, HERBERT M. FRIENDLY, a citizen of the United States of America, and a resident of Portland, county of Multnomah, and State of Oregon, have invented a new and useful Improvement in Methods of and Apparatus for Fault Location on Electrical Conductors, of which the following is a specification.

My invention relates to that class of electrical testing devices intended for use in locating grounds or crosses on electrical conductors in cables or on insulators, and involving the use of adjustable resistances and of a galvanometer or other current-detecting device.

It is well known to utilize adjustable resistances and galvanometers or other current detectors, in connection with sources of current for locating grounds and crosses upon lines; but in all the methods which are available for use with apparatus of limited complication and reasonable scope, a certain amount of mathematical calculation is necessary after the manipulation of the instruments has been completed. For the reason that such calculations are necessary and because they involve the use of mathematical processes not familiar to all persons, fault location is an art which has remained relatively unknown to many persons whose occupation otherwise would adapt them to conduct such undertakings.

My invention enables fault locations to be made with a minimum of operations and calculations, rendering possible the formulation of specific instructions which need but to be followed by a person of usual intelligence and limited special training to enable the results to be reached in terms commonly understood and not complex.

Figure 1:
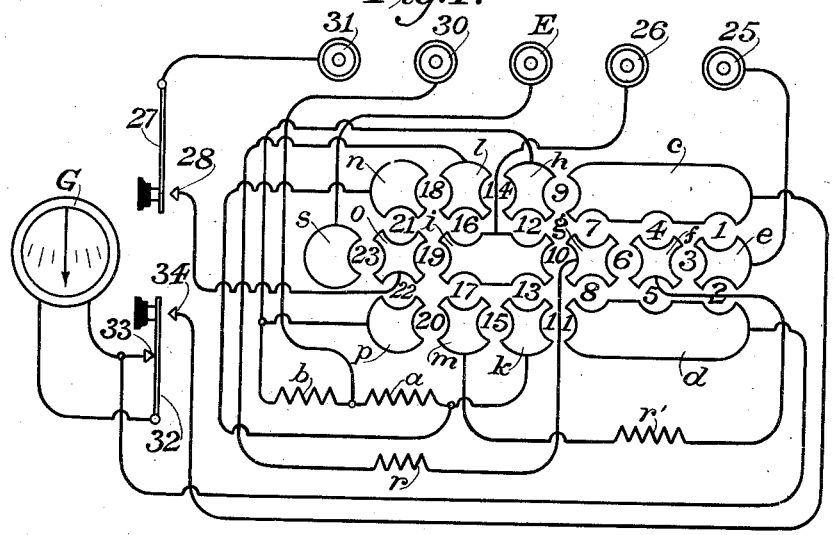
Figure 2:
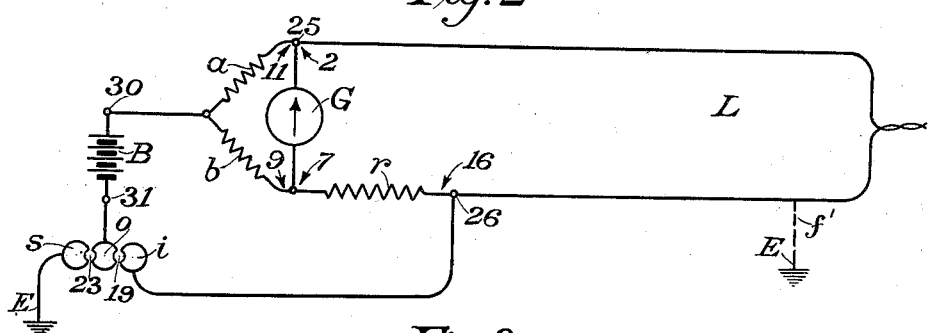
Figure 3:
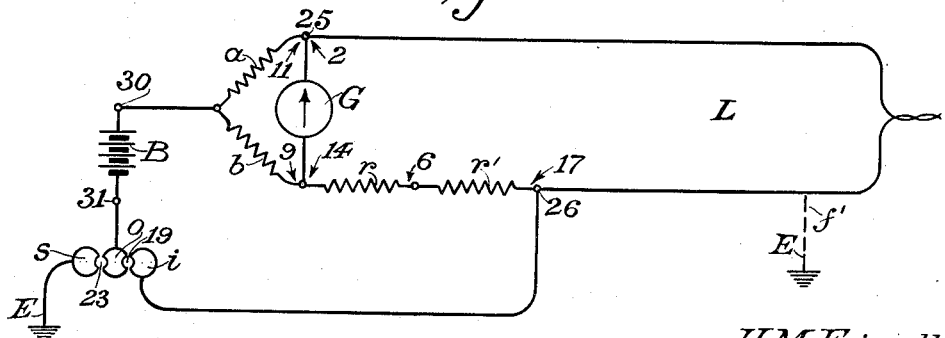
Figure 4:
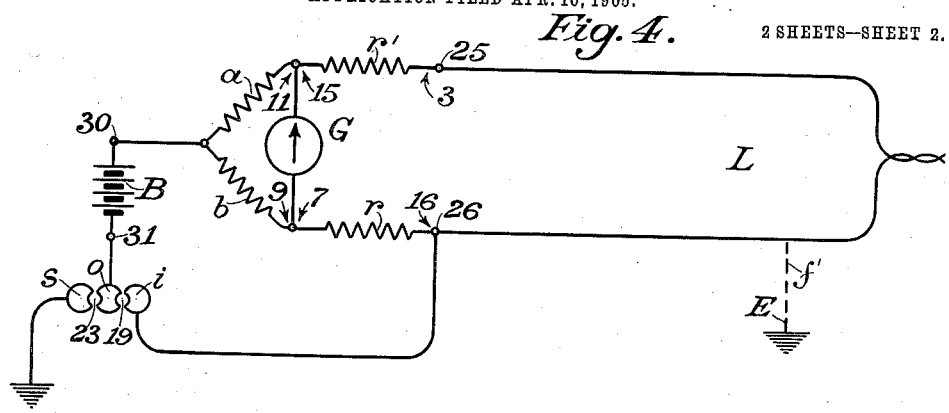
Figure 5:
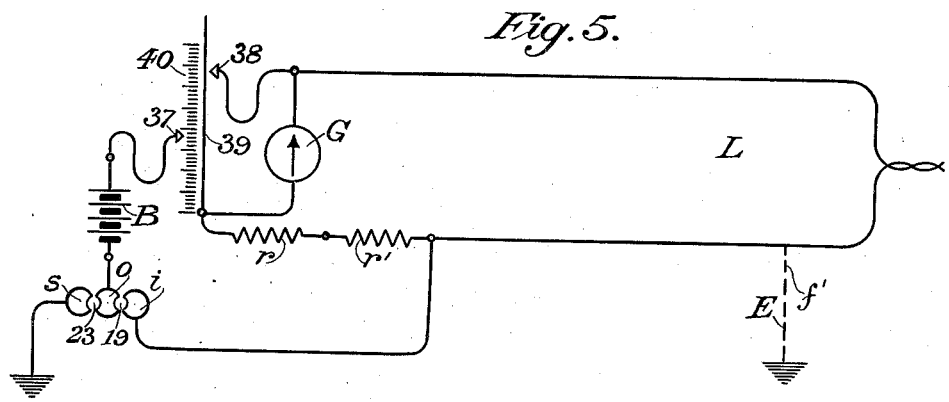

My invention is illustrated in the accompanying drawings, in which,

Figure 1 shows a plan view of the commutator or master-switch, together with a diagrammatic arrangement of the other elements associated with said commutator in one form of a complete testing set made in accordance with my invention, Fig. 2 is a schematic illustration of one of the cases of test, Fig. 3 is a schematic illustration of a case of testing, using an additional and, if desired, uncalibrated resistance, Fig. 4 is a schematic illustration of a case of testing involving another relation of the resistances, and Fig. 5 is a schematic illustration of a case of testing involving an adjustable slide wire bridge.

Similar characters refer to similar parts throughout the several views.

In Fig. 1 are contained the elements of illustration required to make clear the construction of the commutator of my invention, this being a device of the general form commonly used in rheostats and resistance boxes having conducting blocks mounted on an insulating support, these blocks being arranged as terminals of various elements of the circuits and adapted to receive between them conical conducting plugs. The sides of the blocks being drilled and reamed to form conical holes, the conical plugs serve to join the blocks together wherever inserted, and in the arrangement which I illustrate a wide variety of modifications may be made upon the circuits. The conducting blocks of the commutator are indicated by the reference letters, $c$, $d$, $e$, $f$, $g$, $h$, $i$, $k$, $l$, $m$, $n$, $o$, $p$ and $s$. The conical plugs are omitted from the figure: They are of well known form and may be inserted into any of the holes between the blocks in order to bring about the desired circuit arrangements. The conical holes which may receive such plugs are indicated by the numerals, 1 to 23, inclusive. The blocks are secured to a flat insulating support, which latter is not shown in the drawings, and the binding posts, 25, 26, E, 30 and 31, the two keys formed respectively of the parts 27 and 28, and the parts 32, 33 and 34, and the galvanometer, G, are associated with said blocks, preferably by being secured to the same plate.

The zigzag lines, $a$, $b$, $r$ and $r'$, represent suitable resistances, adjustable between certain predetermined limits, in any suitable manner, as by the withdrawal or insertion of plugs in an ordinary plug rheostat, by the moving of a pivoted arm over contact points having resistances connected between them, by the moving of a contact along a bare resistance wire, or in any other of the ways well known to the art of electrical testing. The resistance $r$ must be adjustable to zero as one of its limits. It is optional whether these adjustable resistances $a$, $b$, $r$ and $r'$ be associated with the commutator as a unit. They may be mounted with equal accuracy of result in separate cases, although connected to circuits of the commutator as indicated in Fig. 1. This optional separation is also permissible in the case of the galvanometer and the keys.

The office of the commutator is to provide convenient methods of switching, by which the circuit relations required for the tests which I describe may be readily obtained. Scrutiny of the circuits in Fig. 1 will make plain the considerable latitude of arrangement of parts that may be secured by inserting plugs in the variously numbered holes, thus electrically joining the variously lettered blocks; it is not meant that all of the plug holes shall be filled with plugs for a given test, or that any tests are possible with all of the holes unplugged. As will be further described, certain conditions of plugs will place the elements into certain required circuit arrangements.

It is assumed at the outset that the various ordinary methods of testing for the value of an unknown resistance by the Wheatstone bridge principle are well known, and that that variation of the Wheatstone bridge principle which is known as the Varley loop test is also well understood, as it is these methods which are by far the most widely used in resistance measurements, particularly upon telegraph and telephone lines.

Considering the case of a test to be made to determine the location of a ground or cross upon one of two wires, one of the wires used in the test being clear of any fault, these two wires being joined at the distant end,—it will easily be seen that the ordinary Varley loop test may be applied. In this case a calibrated resistance, such as $r$, would be inserted in the conductor leading from one terminal of the galvanometer to the wire having the fault upon it. Then with the battery grounded at E so as to supply current through the fault, this resistance may be adjusted until no deflection of the galvanometer occurs, under the general condition shown in Fig. 2. The customary formula for the Varley loop test is:

$$R = b\frac{L-ar}{a+b},$$

R being the resistance in ohms from the point of testing to the fault, $f'$, $b$ and $a$ being the respective arms of the bridge in the general relation shown in the figure, L being the total series resistance of the two wires under test, or, in other words, of the loop, and $r$ being the resistance of the rheostat as varied to produce a condition of no deflection in the galvanometer.

The three distinct steps in the ordinary Varley loop test as performed on my apparatus may be understood by referring more particularly to the exact conditions shown in Fig. 2. It is to be noted that the numerals associated with the drawing by small arrows have reference to the connecting plugs in the commutator shown in Fig. 1. For example, the numeral 11 indicates that at the point referred to by its arrow the hole 11 of the commutator is plugged up, thus producing the exact circuit condition shown at that point in Fig. 2. Reference numerals, such as 30, shown adjacent to a point of the circuit but without the arrow indicate parts other than plug-hole parts of the commutator. Arranging the commutator plugs as indicated, with a plug additionally in the hole 19, but with none in the hole 23, and adjusting the arms $a$ and $b$ to have a ratio to each other of 1 to 10, of 1 to 100, or in any other ratio of 1 to some power of 10, the resistance $r$ may be varied until no deflection of the galvanometer G occurs when the keys having levers 27 and 32 are depressed. Under the conditions established, the test made will have been a simple Wheatstone bridge measurement of the resistance of the loop L, and this resistance is determined at once by multiplying the determined resistance $r$ by the previously established ratio of $a$ to $b$. Knowing the value thus determined, unplugging the hole 19, plugging up the hole 23 so as to apply the battery connection through the fault at $f'$ and E, the resistance $r$ may be again adjusted to a balance. All quantities in the second member of the Varley loop equation are now known, and the resistance R to the fault may thus be determined.

The foregoing illustrates the application of the commutator of my invention to two of the principal useful forms of testing involving subsequent calculations, that is, to the measurement of resistances, as of the loop L, Fig. 2, by the simple Wheatstone bridge method, and to the ordinary application of the bridge to Varley loop methods. By means of my commutator or master switch I am enabled to perform many other of the ordinary well known tests to which the Wheatstone bridge is generally adaptable. It is, however, to a new process or method of measurement or fault location, as well as to the arrangement of apparatus herein shown, that my invention is directed.

In the Varley loop test, as ordinarily practiced, three steps are necessary: first, the determination of the loop resistance of the two wires under test; second, the balancing of the good wire in series with the remote portion of the faulty wire against a known variable resistance in series with the near portion of the faulty wire, and, third, the substitution of the loop resistance determined in the first step, and the resistance necessary to balance as determined in the second step, in the Varley loop equation already given, in order to solve for the resistance to the fault on the faulty wire.

In my improved method, made possible by my improved arrangement of apparatus, the loop resistance L is involved in the balancing of the resistance $r'$, and the resistance $r'$ then is retained as a part of the circuit of the later test. The introduction of the result of the first test into the second test thus is made automatically the necessity of any knowledge on the part of the operator of the loop resistance or of the absolute value of the $r'$ resistance is obviated. This method may now be understood by referring to Fig. 3, bearing in mind the described meaning of reference numerals accompanied by arrows. In addition to the inserted plugs as indicated in this figure, assume hole 23 to be plugged, hole 19 to be unplugged, and resistance $r$ to be adjusted to zero; then the resistance $r'$ may be adjusted to a balance of the galvanometer under any of a large number of ratios between the bridge arms $a$ and $b$: but for this ratio I now choose values of $a$ and $b$, such that $a$ will be 1/9, 1/99, etc., of $b$, the sum of $a$ and $b$ being always, in the present illustration, some power of ten when referred to $a$ as a base. When a balance has been reached, unplug 23 and plug up 19, and once more manipulate the keys, and, leaving $r'$ as adjusted, adjust $r$ until a balance has been reached. Then the resistance in ohms to the fault is the resistance $r$ multiplied by the ratio of the arm $a$ to the sum of the arms $a$ and $b$. That this is so is readily proven: When hole 23 is plugged, grounding the battery, and a balance is secured by manipulating $r'$, $r$ being zero, $$\frac{a}{b} = \frac{L-R}{r'+R} \quad (1)$$

When hole 19 instead of 23 is plugged, and a balance again secured, by manipulating $r$, leaving $r'$ as adjusted, $$\frac{a}{b} = \frac{L}{r+r'} \text{ or } L = \frac{a(r+r')}{b}$$

Substituting this value for L in (1) and solving for R, $$R = r\frac{a}{a+b}$$

But with the value chosen the sum of $a$ and $b$ is always some power of 10 when referred to $a$ as a base; therefore, $$\frac{a}{a+b} = \frac{1}{10^x}$$

and the value of R therefore becomes, $$R = \frac{r}{10^x}$$

and the calculation is simply to divide the value of $r$ by the particular power of 10, or in other words to point off from the right of the adjusted value of r as many places as there are ciphers in the power, or units in the index of the power.

It will be seen that the operations here are exceedingly simple, and with the prerequisite bridge arm relations established, no real calculations whatever are necessary. It will be noticed that in the first adjustment to galvanometer zero by the use of resistance r′, something of the usual process of determining the value of the resistance r′ was accomplished, but in contradistinction from methods requiring an exact determination of the numerical value of the resistance r′, my method takes no account of the nominal numerical value of r′ but only utilizes it in a way such that it finally disappears from the equation without its value having been definitely determined, leaving that determination in the circuits as a means to a final end, and not as an element of calculation. It will thus be seen that the adjustable resistance denominated r′ may for this test be any adjustable resistance but not necessarily a calibrated resistance. All that is required is that it be variable within reasonable limits, and that it remain constant after adjustment only for the time required to complete the operations peculiar to the test.

Sometimes it is desirable, as a check method, or for other reasons, to use a variable resistance in the limb of the line having no fault. Such an arrangement is shown in Fig. 4, the resistance r′ being placed in the opposite limb of the line from the resistance r. This arrangement is readily accomplished with my commutator by inserting the plugs in the various proper holes as indicated by numerals in Fig. 4. With the apparatus thus arranged, the test for the location of the fault, f′, may be made as follows: Plug up 23, unplug 19, and adjust r to zero. Establish a relation of bridge arms in which the sum of a and b is the product of b and some power of 10; adjust r′ to the balance of the galvanometer. Now, unplug 23 and plug up 19, and make the arms a and b equal to each other—a ratio of unity—. Then adjust r to a new balance of the galvanometer. The resistance to the fault is then the resistance r divided by the ratio first established between b and the sum of a and b, or, $$R = \frac{r}{10^x}$$

That this is so is thus proven; when the first balance was obtained, $$\frac{a}{b} = \frac{r'-L-R}{R} \quad (2)$$

When the second balance was obtained with equal arms, then, r′−L=r. Substituting this in (2), $$\frac{a}{b} = \frac{r-R}{R},$$

whence, $$R = r\frac{b}{a+b}.$$

But, under the values assumed for a and b, $$\frac{b}{a+b} = \frac{1}{10^x};$$

hence, $$R = \frac{r}{10^x}.$$

It will be seen that the mathematical operations other than balancing are only with relation to the simple ratios of the bridge arms, and are accomplished by pointing off or adding ciphers only.

Referring now to Fig. 5,—39 is an adjustable resistance wire, rod, or similar uniform conductor; 37 and 38 are respectively contact points capable of adjustable contact with the resistance 39; 40 is a scale assisting in determining the relation of the resistance 39 and the contact points 37 and 38. By the adjustment of 38 in contact with 39, the total amount of resistance thus included in shunt with the galvanometer G may be arranged; by moving 37 with relation to 39, the total resistance included by 38 on 39 may be divided into two parts, that included between the contact points 37 and 38 corresponding to arm a in the previous figures, and the remaining portion corresponding to the arm b. With this arrangement and the process described with relation to Fig. 3, most rapid locations can be made. By an arrangement of parts converting the positions of the resistances r and r′ to be those shown in Fig. 4, the advantages of the slide wire bridge in Fig. 5 may be applied to the test described in connection with that figure also. In fact, if the slide wire shown in Fig. 5 be substituted for the resistances a and b of the other figures, any of the tests that may be performed with my improved apparatus may be accomplished, in many cases wth increased facility.

In the foregoing a most important feature is that of the bridge-arm ratio, which by previous determination may eliminate all calculation of the resistance in ohms to the fault, which is the result desired. It is not always necessary, however, to know the resistance in ohms, as it is frequently important to know the distance in feet or meters, if the conductor be in a cable. In fact, the determination of the resistance to the fault is usually used as a basis of determining the distance to the fault. My invention is capable of quite as convenient use to read directly in terms of distance as in terms of resistance, and by the application of the same principles as I have already described.

Generally stated, the principle as applying to resistance determinations is that one bridge arm shall be to the sum of the arms as 1 is to a power of 10.

In the case of results to be reached in terms of distance, the principle may be stated as being that one bridge arm shall be to the sum of the arms as 1 is to the length per ohm of the conductor under test. Thus, in the case of feet, as 1 is to the feet per ohm of the conductor, or in the case of miles, as 1 is to the miles per ohm of the conductor. To illustrate, suppose a conductor having 63 feet per ohm were under test: In making the Varley loop test as in Fig. 3, the arm a might be given a value of unity and the arm b a value of 62, equal to 63 − 1. Then the formula $$R = \frac{ra}{a+b},$$

which finally expresses the result, becomes with these values, $$R = \frac{r}{63},$$

in which R is the resistance in ohms to the fault. If now D be taken as the distance in feet to the fault, it is evident that D = 63R, whence it follows that D=r. In other words, the adjusted value of the resistance r is equal to the distance in feet to the fault, and the instrument thus used is direct reading. Were the conductor under test of resistance of 63.2 ft. per ohm, the bridge might be set to 1 and 62.2 respectively for the arms, or to 10 and 622 ohms, since in either case the ratio is the same.

The quantity, feet per ohm, meters per ohm, etc., depends upon the specific resistance, the area of cross section, and the temperature of the conductor and the conductor material, and can be determined by well known means, as from tables. In the case of copper, for example, the resistance of a foot of circular wire, one-thousandth of an inch in diameter, may be said to be 10.8 ohms. If the cross section of a copper wire expressed in circular mils be divided by 10.8 the result will be the number of feet per ohm of the wire. A foot of wire one-thousandth of an inch in diameter is called a mil-foot; similarly, a mil-yard, mil-mile or mil-meter resistance may be employed, the result of division being in terms of yards per ohm, miles per ohm, meters per ohm, etc. Applying this matter to the simplification of tests to be read in distance, I may adjust the bridge arms,—for example, in Fig. 3,—so that arm $a$ is to the sum of the arms $a$ and $b$, as the mil foot of resistance of copper is to the area in circular mils of the wire under test. On balancing to a zero movement of the galvanometer by adjustment of the two resistances as described for that figure, such a value of $r$ is directly given as corresponds to the distance in feet to the fault. For example, if the test were being applied to a faulty conductor in a cable formed of wires of #22 Brown & Sharpe gage, the faulty conductor would be looped with any good conductor at the distant end; the area of #22 wire in circular mils being 642.8, and the mil-foot resistance of copper being 10.8, the bridge would be respectively 10.8 for $a$ and (642.8—10.8) or 632 ohms for $b$. The process of subtraction is rendered unnecessary in setting the bridge arms, as it is made automatically; by setting 37 to 10.8 and by setting 38 to 642.8 the bridge arm $b$ becomes equal to the difference of the two values without the necessity of solving an equation for the actual value of the difference. Were the results desired to be in some other unit than feet, it would only be necessary to determine the proper mil-unit amount for the arm $a$, placing 37 to that amount instead of to 10.8 in the above example. The results then would read directly in terms of the new lineal unit.

Variety is possible in the method of calibrating the scale. Two or more calibrations may be used simultaneously. There may be a scale for specific resistances, say for the unit of a mil-foot, the points on the scale being marked, "Copper", "Aluminium", "Iron", "Steel," "BB," etc., etc., and another scale of cross sections in circular mils, the divisions of the latter scale being marked "#8 B. W. G.", "#12 B. & S.", "#14 B. & S.", etc., etc. In addition to these special scales, the usual numerical scale might be given for general work. The user now desiring to locate a fault on a circuit of #12 B. & S. copper wire would set 37 to "Copper" and 38 to "#12 B. & S." and make the two adjustments of $r'$ and $r$, the latter of which would be a direct reading of the distance to the fault, in feet. A slide wire resistance is not an absolute necessity in this system of calibrations, but it seems the simplest to show in the drawings accompanying these specifications.

Having thus described my invention, what I claim as new and desire to secure by United States Letters Patent is,

1. In a Wheatstone bridge, the combination of a pair of adjustable ratio-arms, a current detector, an adjustable resistance adapted to form the fourth arm of the bridge, a second adjustable and calibrated resistance adapted to be included in the fourth arm of the bridge and adapted to be adjusted independently of said first adjustable resistance, and a commutator adapted to connect together the elements above enumerated, a source of electric potential and the conductor under test, substantially as described.

2. In an electrical testing device, the combination of a pair of adjustable ratio arms; a current detector; an adjustable resistance; a second adjustable resistance adapted to be adjusted independently of said first adjustable resistance; and a commutator having terminals for said parts and for a source of current and for a conductor to be tested, and adapted to connect said parts in a Wheatstone bridge system wherein said pair of ratio arms form the first and second arms of the bridge system, said first adjustable resistance is included in a third arm and said second adjustable resistance is included in the fourth arm, substantially as described.

3. In an electrical testing device, the combination of a pair of adjustable ratio arms; a current detector; an adjustable resistance; a commutator having terminals for said parts, for a conductor under test, and for a source of current; and a switch adapted to connect one of the current-source terminals to a terminal of the conductor under test or to earth, alternatively, substantially as described.

4. In a Wheatstone bridge, a pair of adjustable ratio arms comprising a continuous resistance extending from the extremity of one arm through the point of current entrance to the extremity of the other arm; adjusting means for adjusting the combined resistance of the said pair of ratio arms, and adjustable means for connecting the current source to said joint arm-resistance whereby it may be connected at a point dividing said joint arm-resistance into two arm-resistances for individual bridge arms having any desired ratio, substantially as described.

5. In a Wheatstone bridge, a pair of adjustable ratio arms comprising a continuous slide-wire resistance; a sliding contact on said slide wire for adjusting the resistance of the included portion of said slide wire; and a second sliding contact for connecting the current source whereby it may be connected at a point dividing the total included slide-wire resistance into two resistances for individual bridge arms having any desired ratio, substantially as described.

Signed by me at Portland, county of Multnomah and State of Oregon, in the presence of two witnesses, this ninth day of March, 1905.

HERBERT M. FRIENDLY.

Witnesses:
M. S. FRIENDLY,
ALLEN C. RAE.

It is hereby certified that Letters Patent No. 859,556, granted July 9, 1907, upon the application of Herbert M. Friendly, of Portland, Oregon, for an improvement in "Methods of and Apparatus for Fault Location on Electrical Conductors," errors appear in the printed specification requiring correction, as follows: In line 70, page 1, the word "conica" should read *conical;* line 49, page 3, in the equation "$r'-L-R$" should read $r'+L-R$, and in line 52, page 3, "$r'-L$" should read $r'+L$; and that the said Letters Patent should be read with these corrections therein that the same may conform to the record of the case in the Patent Office.

Signed and sealed this 3rd day of September, A. D., 1907.

[SEAL.]

E. B. MOORE,
*Commissioner of Patents.*